March 25, 1952  D. B. LUTEN, JR  2,590,436
METHOD FOR CONTROLLING CHEMICAL REACTIONS
Filed June 21, 1948  2 SHEETS—SHEET 1
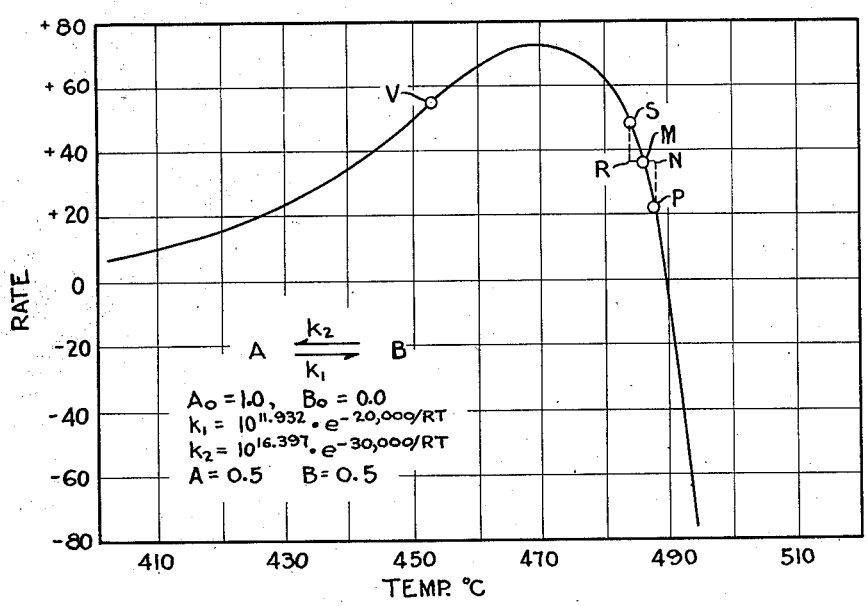
FIG. I
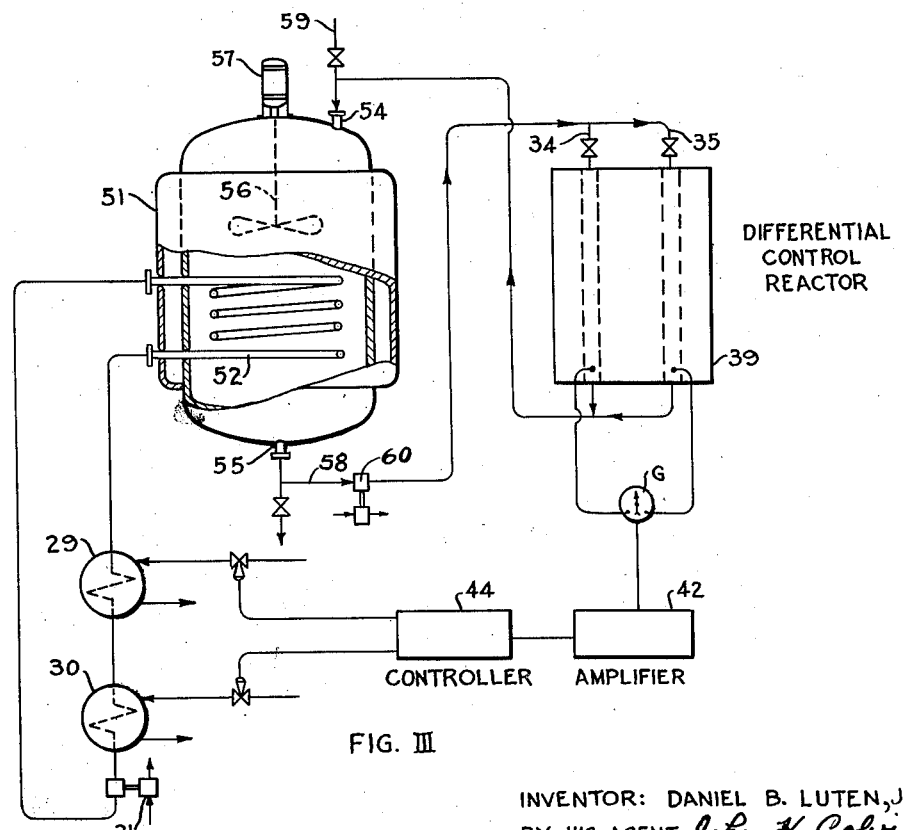
FIG. III
INVENTOR: DANIEL B. LUTEN, JR.
BY HIS AGENT John H. Colvin March 25, 1952 D. B. LUTEN, JR 2,590,436
METHOD FOR CONTROLLING CHEMICAL REACTIONS
Filed June 21, 1948 2 SHEETS—SHEET 2
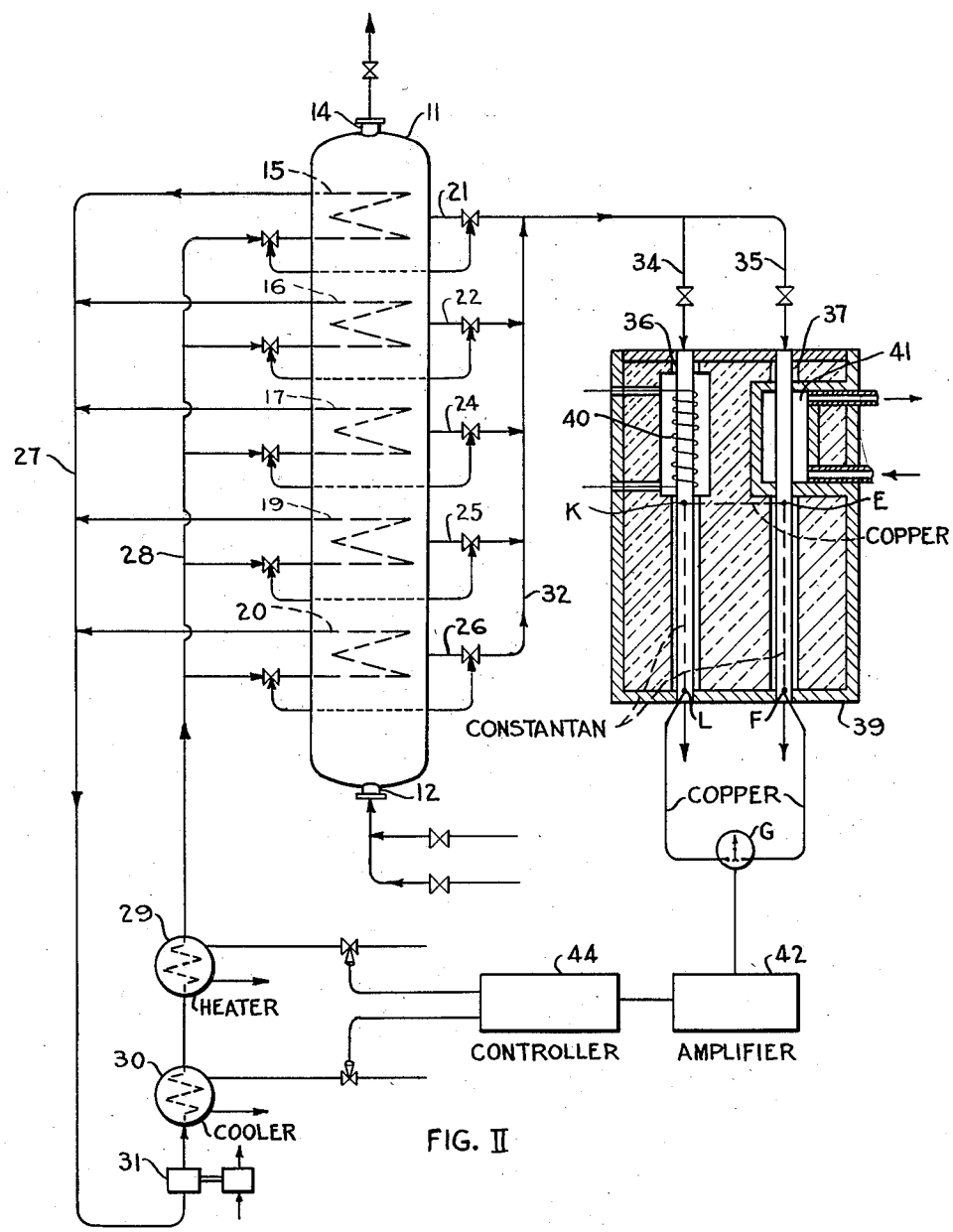
FIG. II
INVENTOR: DANIEL B. LUTEN, JR.
BY HIS AGENT John H. Colvin Patented Mar. 25, 1952

2,590,436

UNITED STATES PATENT OFFICE 2,590,436

METHOD FOR CONTROLLING CHEMICAL REACTIONS

Daniel B. Luten, Jr., Berkeley, Calif., assignor to Shell Development Company, San Francisco, Calif., a corporation of Delaware Application June 21, 1948, Serial No. 34,157

8 Claims. (Cl. 23—1)

This invention relates to method and apparatus for controlling chemical reactions. More particularly, it is concerned with the control of the temperature of exothermic chemical reactions so as to obtain more efficient conversion to desired reaction products.

In the art of effecting chemical reactions, there are many processes involving exothermic reactions which proceed to an adverse or only moderately favorable equilibrium when temperatures are employed where the reaction rate is satisfactorily high. It is known that, under such circumstances, the equilibrium will become more favorable if the temperature is lowered. However, a lowering of the temperature is accompanied by a reduction in the reaction rate. This means that the reactor volume must be increased to obtain a given yield of product in a given period of time, or the time required to obtain a given product yield for a given reactor is increased. Since the reduction in rate accompanying a reduction in the temperature is commonly greater in magnitude than the resulting increase in the equilibrium constant, one is confronted with the necessity of choosing between the advantage of high equilibrium conversion at low temperature with its disadvantage of low reaction rate and the advantage of high reaction rate at high temperature with its disadvantage of low equilibrium conversion. In some instances an attempt has been made to reach a favorable compromise between the two extremes by employing a suitably intermediate temperature. In some instances, as in the synthesis of ammonia from nitrogen and hydrogen, the compromise has been still further extended to carrying out the reaction for an initial period of time at a high temperature and later stages at lower temperatures.

It has recently been shown (Denbigh, Trans Faraday Society, vol. 40, p. 352, September, 1944) that the maximum conversion in a given reactor for a given reaction will be obtained when the variance of temperature with time therein is made such that the velocity of the reaction, at each instant, is at the maximum value possible for the concentration level existing at that instant. Denbigh has also shown that the temperature required for maximum net conversion at a given point, in space and time, in the reaction mixture, at the concentrations at which the reactants occur at that point, may be calculated by the use of equations which may be derived as he has indicated, if sufficient experimental data is available. However, as pointed out by said author, it is unfortunate that in most technical reactions the utility of certain derivable and applicable equations is diminished by the lack of sufficient experimental data.

It is a principal object of the present invention to provide a method and apparatus of controlling exothermic chemical reactions to increase operation efficiency. A further object is to provide method and apparatus for controlling the temperature of a reaction mixture during reaction so that the temperatures of the various portions of the reaction mixture are adjusted to the temperatures corresponding to the maximum reaction rates of respective reaction mixture portions at the concentrations at which the reactants occur in those portions. Another object is to provide such method and apparatus which function to the desired end without the need for tedious calculations and the like. These objects will be more fully understood and others will appear from the description of the invention.

Now it has been found that improvements may be made in carrying out processes involving reversible exothermic chemical reactions by controlling the temperature of the various portions, which may be termed positioned portions, of the reaction mixture during the reaction, and adjusting and/or maintaining the temperature of these various reaction mixture portions at the temperature at which the rate of reaction of said portion is a maximum at the concentrations at which the reactants occur therein, by the method which comprises isolating, as by removing, two incremental portions of the reaction mixture (which are at substantially the same state of reaction) from a given position portion of the reaction mixture, imparting an incremental temperature change ($\Delta T$) to at least one of the isolated portions so that the two portions are adjusted to different temperatures one being higher than the other, permitting the reaction to proceed adiabatically in each incremental portion, comparing relative changes in properties, as by measuring the relative temperature rises, in the two isolated portions which changes result from the exothermic reaction in the adiabatic zones, and adjusting the temperature of the positioned portion of the reaction mixture from which the portions were withdrawn in accordance with the compared property, such as the temperature, of the incremental portion which produces the higher relative change in compared property, such as temperature rise, in the adiabatic reaction zones. Generally, this is continued until there is no difference between the two temperature rises, that is until the difference reaches a minimum and begins to change in sign thus indicating that a maximum reaction rate has been reached.

Where the terms, "position portion" and "positioned portions" are used herein and in the claims, they are used in the sense of portions which are displaced in space as at different positions along the stream of flow in a reaction system wherein the reactants are caused to flow concurrently and substantially uniformly through a continuous type of reaction zone and/or in the sense of portions which are displaced in time as at different instances of time during a reaction wherein selected portions of the reactants are mixed in a batch-type reaction vessel and the reaction is permitted to continue while the reaction mixture is maintained in a susbstantially uniform state of mixing therein until the reaction has reached a practical equilibrium for the conditions chosen.

In a reaction which is carried out in a continuous flow reactor wherein the reactants are caused to flow concurrently therethrough from the inlet to the outlet openings and without intimate mixing of the resulting reaction mixture near the outlet with the reaction mixture near the inlet, the various portions of the reaction mixture at different spacial positions in the reaction zone along the line of flow of the mixture reach different states of reaction, and yet the reaction reaches a substantially steady state at any given position although material continues to flow into and out of the incremental cross-sectional volume thereat. Thus, in this type of reaction, the various portions which are differently positioned in space (differently spacially positioned portions) are reacting under different conditions as to the reaction variables of concentrations of reactants and products and possibly also of temperature, whereas for a given reaction zone portion a steady reaction state is reached, which may or may not be the state which is optimum for the greatest economy of operation. The method of the present invention, as broadly stated hereinbefore, is applicable to adjusting and maintaining the temperature of each of these portions so that the maximum, and therefore most efficient, rate of reaction is obtained therein.

In a reaction which is carried out in a batch reactor wherein selected proportions of the reactants and resulting reaction products are maintained in a substantially uniform state of mixing and the reaction is permitted to continue until the reaction has reached a suitable state for the conditions chosen, the temperature(s) and time are controlling factors in a given reaction for determining the state which will be reached. For instance, for a reaction carried out isothermally at a selected temperature, the state reached will depend on the time allowed for the reaction at the chosen temperature; practical equilibrium may or may not be reached. As the reaction progresses in time the relative concentrations of reactants are changing, that is, portions of the reaction mixture in the reaction zone which are taken from the same volume portion of the reaction zone but at different time periods (differently time positioned portions) are reacting under different conditions as to the reaction variables of concentrations of reactants and products, and possibly also of temperature if it is permitted to change or if it is changed deliberately. The method of this invention as defined hereinbefore is applicable to controlling the temperature of these differently time positioned portions of reaction mixture so that the maximum rate of reaction is obtained at each time interval as the reaction proceeds and, therefore, the reaction is effected most economically.

The invention may be applied to the control of various reversible exothermic reactions, in both the liquid and gaseous states, both catalyzed and uncatalyzed. Some well known reactions to which it is applicable are: the synthesis of ammonia from nitrogen and hydrogen; the formation of sulfur trioxide from sulfur dioxide and oxygen; various other oxidation reactions and particularly of organic compounds; hydrochlorination of unsaturated hydrocarbons; hydration of olefins; reaction of alcohols with $\alpha,\beta$-unsaturated carbonyl compounds, such as the reaction of methyl alcohol with mesityl oxide (4-methylpenten-3-one-2). The criteria are that the reaction be reversible and exothermic and that substantially uniform fluid samples of the reaction mixture, including any catalyst present, are obtainable from the reaction zone.

In the practice of the method of the invention, various properties of, or measurable quantities associated with, the reaction mixture, preferably physical properties, may be compared for the two adiabatically reacting comparison portions of the reaction mixture, and the differences in the relative changes in values thereof utilized as the basis for the adjustment and control of the temperature in the reaction zone. For instance, for many reactions, small changes in relative proportions of reactants and products result in easily measurable differences in refractive index which may be readily measured with well known refractometers, some of which are capable of measuring continuously the refractive index of a flowing stream. In the case of reactions in continuous flow reactors wherein steady states are reached and are maintained over extended periods of time, more time-consuming determinations of property changes of the system may be made, as by chemical analysis.

The invention will be more fully understood from a more detailed description thereof made with reference to the accompanying drawing wherein, Fig. I is a graph showing the relationship between the rate of reaction and the temperature for a given reaction at a given state as to concentrations and the like as indicated therein, Fig. II is a diagrammatic drawing of a system employed in one embodiment of the invention as related to carrying out a reaction in a continuous type reactor, and Fig. III is a diagrammatic drawing of a system employed in another embodiment of the invention as related to carrying out a reaction in a batch type reactor.

For a better understanding of the invention, and with reference to Fig. I, consider a simple reaction which is of first order both forward and reverse, and which has activation energies $E_1$ and $E_2$, respectively, of 20,000 and 30,000 calories per mol. Assuming that the well known Arrhenius equation is strictly applicable and that the probability factors $p$ and $q$, therein for the forward and reverse reactions are $10^{11.932}$ and $10^{16.397}$, respectively, the rate of approach to equilibrium, for this kinetic situation is proportional to the distance from equilibrium, the following equations express certain pertinent relationships:

Expressing the reaction as $$A \rightleftharpoons B$$

with forward and reverse rate constants of $k_1$ and $k_2$, respectively, $$k_1 = 10^{11.932} \cdot e^{-20,000/RT}$$

and $$k_2 = 10^{16.397} \cdot e^{-30,000/RT}$$

the equilibrium constant, $K = k_1 k_2$, is given by the equation $$K = 10^{4.465} \cdot e^{-10,000/RT}$$

(R is the well known gas constant and has a value such that $2.3R = 4.5739$; T is absolute temperature).

At a conversion of 50% for example, $K = 1$, and the equilibrium temperature, $Te$, is calculated from the above equation to be 489.7° C.; this is the temperature of the point on the curve in Fig. I at which the rate of the reaction is zero (the net rate is zero at equilibrium since the opposing forward and reverse reaction rates exactly counterbalance each other).

The temperature, $Tm$, of maximum rate, at the concentrations corresponding to this same conversion is calculated by use of the relationship $$(Te - Tm)/TeTm = [R/(E_2 - E_1)] ln(E_2/E_1),$$

(ln denotes natural logarithms), given in the Denbigh article referred to hereinbefore, and found to be 471.1° C.; this is the temperature of the point on the curve in Fig. I corresponding to the maximum rate. The rates for the reaction at $Te$ and at $Tm$, as well as for a number of other temperatures in this neighborhood, at 50% conversion and for the case where the initial concentration of reactant A was one mol per liter and that of reactant (product) B was zero have been calculated with the aid of the equation $$v = (a \cdot p \cdot e^{-E_1/RT}) - (b \cdot p \cdot e^{-E_2/RT})$$

where "$a$" and "$b$" are the concentrations of reactants A and B at the conditions under consideration—in this case each is 0.5. These rate-temperature values are shown graphically by the curve in Fig. I. Similar curves (relationships) are obtained for states of other percentage conversions, there being one temperature for each set of concentration values at which the net rate of the reaction (forward—reverse) is a maximum, and the $Tm$ values at the different concentrations are different. In general, this is also true for more complicated reactions and for reactions of higher order than the first order and for polymolecular reactions.

An examination of the curve in Fig. I shows that for a given instantaneous set of reaction concentrations for a given system, there is only one temperature at which the reaction will proceed at a net maximum rate. Furthermore, as the reaction proceeds and the relative concentrations are changed, the temperature of maximum net rate changes. As already indicated hereinbefore, and as will be readily apparent from the foregoing indicated calculations, calculations of the $Tm$ values require much experimental data. Furthermore, even with a knowledge of the various $Tm$ values ranging over the complete conversion range, the period of time for which the reaction mixture must be maintained at a given temperature of maximum rate (conversion) must be determined. However, further examination of the curve in Fig. I shows that a method may be devised for adjusting the temperature to the value of maximum rate, and maintaining that temperature, regardless of the degree of conversion, the relative concentrations, the time interval of the reaction or the values of other controlling factors, and without the necessity of making any calculations or of obtaining the detailed experimental data required for such calculations as already indicated.

Referring to Fig. I, and assuming that the indicated reaction system is at the state indicated by point M on the curve, results of application of the present invention may be represented by the dotted lines MNP and MRS following from the isolation of two portions of the reaction mixture, cooling one portion as indicated by MR and heating the other as indicated by MN, after which the two portions are permitted to react adiabatically, with the rates being as indicated as S and P, respectively. Since the exothermic reaction rate is greater at the lower temperature R (reaction rate S) than at the higher temperature N (reaction rate P), the relative rate of rise in temperature (rise in a given time interval) of the cooled portion will be greater than for the other portion. Thus, it is demonstrated that a lowering of the temperature increases the net reaction rate, accordingly the temperature of the reaction mixture should be lowered. It will be seen that it is not necessary to change the temperature of both isolated portions of the reaction mixture. By continuing the method the temperature of the maximum rate is reached. Similar considerations apply when the state is as represented by V, on the opposite side of the maximum of the rate. However, in this case the relative temperature rise of the isolated portion which has been heated will be the greater and, accordingly, the temperature of the reaction mixture will be increased. The cooling and/or heating of the isolated portions, streams or samples may vary over relatively wide ranges but will usually be selected to yield measurable, relatively different temperature rises, which may be done by differential means. The magnitude of the heat of the reaction, ΔH, which is equal to the difference in the activation energies, as well as the specific heat of the reaction mixture and the actual rate of the reaction will be controlling factors in determining the selected temperatures for the isolated adiabatic control reactions. The selection of suitable conditions will be understood by one skilled in the art, in view of the teachings herein. It will also be understood that the isolated control portions need not be of equal magnitude.

When the reaction system is at the temperature of the maximum rate, the effect of application of the method of the invention will be to maintain the temperature constant, since the rates of temperature rise of the cooled and heated control portions will be substantially the same for the two portions when reasonable temperature increments (ΔT) of not more than 10° C. and of approximately the same size but of different sign are impressed upon them. Anyway, only negligibly small rate differences would result with only a negligibly small shift of the temperature of the reaction mixture.

Reference is now made to Fig. II for a more detailed description of method and apparatus for practicing the invention. The numeral 11 designates a continuous flow tubular reactor, such as may be used in the synthesis of ammonia, which may be constructed of any suitable material and design and is provided with inlet and outlet openings 12 and 14, respectively, suitable heating and/or cooling means such as coils 15, 16, 17, 18 and 20, or other equivalent heating or cooling means such as jacketed sections, etc.; and a plurality of sample withdrawing means as designated by 21, 22, 24, 25 and 26. The valves in lines 21, 22, 24, 25 and 26 and those leading to coils 15, 16, 17, 19 and 20, respectively, are adapted to be opened and closed in pairs, as shown. The heating coils are connected on one side of each to a common line 27 and on the other side to a common line 28 provided with a suitable heater 29 and cooler 30 and pump 31 for circulating heat transfer medium through selected heating or cooling coils in the reactor. Heating means which are entirely separate from the cooling means may be provided if desired. The valved sample withdrawing lines are connected to a common line 32 which in turn is connected to dividing valved lines 34 and 35. Lines 34 and 35 lead to elongated vessels or tubes 36 and 37 in an insulated vessel 39. Substantially equivalent upper portions of tubes 36 and 37 are provided with suitable heating and cooling means as shown, such as an electrically heated heating coil 40 and a jacket cooling means 41, respectively. The remaining sections of tubes 36 and 37 are provided with suitable thermo-couple junctions, or other suitable elements which are sensitive to temperature changes, such as a plurality of copper-constantan thermocouples as shown, which is connected to a galvanometer, G, adapted to indicate differences in temperature differentials between points K and L in tube 36 and points E and F in tube 37. The galvanometer G is connected to a suitable amplifier 42, as is well known in the art, whereby the differential potentials produced across the thermocouple leads or the galvanometer are amplified to a value capable of actuating well known control means, indicated by 44, to which the amplifier is connected. The control means is suitably connected to the heating and cooling input lines of heater 29 and cooler 30, respectively. If desired, the controller may be dispensed with and the control valves or switches for the heating and cooling means of heater 29 and cooler 30, respectively, may be operated manually in accordance with visually observed indications of the galvanometer deflections.

In the use of the apparatus shown in Fig. II, a reactant, or homogeneous mixture of reactants such as a mixture of $H_2$ and $N_2$ is fed through inlet 12 to reactor 11 wherein it is subjected to reaction conditions, which may or may not include the presence of a catalyst, may be at atmospheric, superatmospheric or subatmospheric pressure, and the reaction mixture may be in a gaseous or a liquid state. The reaction mixture which is obtained near the outlet opening 14 is withdrawn therethrough. Now, in order to adjust the temperature within a given cross-sectional portion or zone of the reactor, a small portion of the reaction mixture existing in such a zone is withdrawn as a continuous stream from reactor 11 through the proper valved line chosen from 21, 22, 24, 25 and 26, passed through line 32, divided into two streams in lines 34 and 35, and passed into tubes 36 and 37, respectively in the insulated vessel 39. The stream in 36 is heated differentially and the stream in 37 is cooled differentially by the provided heating and cooling means 40 and 41. The two separate streams are then passed through adiabatic zones in the two tubes while reaction is permitted to proceed. The difference in the rise in temperature in the two streams in going from points K and E to points L and F, respectively, is measured by means of the thermocouples and galvanometer G. The material in the streams may be discarded, as indicated, or, if desired it may be returned to the reaction zone at any convenient place. The potential difference across G is then utilized, through amplifier 42, and controller 44, to control the flow of heating and/or cooling medium through heater 29 and/or cooler 30, so as to change the temperature of the reaction mixture in the given portion of the reactor in the direction of the temperature of the control stream in 36 or 37, whichever gave the greater temperature increase as indicated by the differential measuring device. The adjustment is thus continued until a null point is reached on the differential temperature measuring device indicating that the temperature at the given point in the reaction zone corresponds to maximum rate of conversion under the given conditions of concentrations. After thus adjusting the temperature of one portion of the reaction zone, the temperatures of the other zones may be adjusted in a similar manner. Since the space velocities through the different sections may be different depending on various factors and the rates of reaction at different adjusted temperatures in different sections will be different, the optimum times of reaction at the different temperatures will vary, and, therefore the lengths of the zones for a given temperature may vary. In any case, proper adjustment will be made by the method of the invention. If desired, individual control means may be provided for each section of the reactor and then lines 34 and 35 of each control device may be connected directly to the given section of the reactor.

When such individual control means are provided for the different sections it will, in general, be found to be desirable to begin the adjustment of temperature nearest to the inlet of the reaction zone whereat it will be generally preferred to maintain the highest feasible temperature, which may be limited by reactor specifications, thermal stability of reactants, and the like. Thereafter adjustment will be made progressively down the stream. If the desired conversion, which may be dictated by the fact that conversion reaches a rate below which it is not economical to proceed and separation of product from unreacted reactants with recycle of unreacted reactants is preferred, is reached appreciably ahead of the outlet, for a given feed rate and initial feed composition, then the flow rate may be increased and adjustments made again for maximum conversion rates. Thus, the present invention makes it possible to utilize the full capacity of the reactor at the maximum efficiency, and all based on the use of a simplified control system.

Apparatus and method applicable for the practice of the invention as applied to batch type reactions are indicated in Fig. III. Referring to Fig. III, the apparatus shown therein is similar to that shown in Fig. II except that reactor 11 of Fig. II, with its plurality of heat exchange coils and sample withdrawing lines is replaced in Fig. III by a batch-type reactor provided with a single heating or cooling coil 52, upper and lower inlet and outlet openings 54 and 55, respectively, stirrer 56 with motor 57 and a single sample take-off line 58 having a circulating pump 60 for withdrawing a sample and transferring it to the valved dividing lines 34 and 35. The remainder of the system is the same as already described with reference to Fig. II and the same numerals are used to designate similar parts.

The apparatus of Fig. III and its use will be better understood from a description of its application to the carrying out of the base catalyzed reaction of mesityl oxide with methyl alcohol in accordance with the equation:

(CH₃)₂C=CH·CO·CH₃+CH₃OH ⇌
(CH₃)₂C(OCH₃)·CH₂CO·CH₃

When a homogeneous liquid charge of substantially equal molar quantities of mesityl oxide and methanol, is charged at room temperature (20–25° C.) to the reactor 51 by means of line 59 and opening 54, and a small percentage such as 1 mol percent, of a base and such as sodium hydroxide is added, and the mixture is thoroughly agitated, the temperature of the mixture rises to about 40° C., on account of the exothermic heat of the reaction. At 40° C. the time required for equilibrium to be reached is about 15 minutes, but the equilibrium mixture represents a conversion of only about 35% of the mesityl oxide. When the reactants are mixed and maintained at −30° C. until equilibrium has been reached, an equilibrium conversion of about 75% is obtained, but the time required to reach within about 95% of that equilibrium conversion at −30° C. is about 360 hours, which is a prohibitively long time. When the method of the present invention is used to control the reaction to obtain substantially 75% conversion in the minimum of time a correspondence of temperature and period of time at that temperature is obtained as follows: about 7 minutes at about 40° C., about 5 minutes at about 30° C., about 13 minutes at about 20° C., about 35 minutes at about 10° C., about 100 minutes at about 0° C., about 300 minutes at about −10° C., about 1000 minutes at about −20° C., and about 4000 minutes at about −30° C. Thus, by the method of the present invention, the time required for 75% conversion is reduced to only about 90 hours. It will be noted that the times indicated above are considerably less in each instance than the time required for equilibrium to be reached at the given temperature.

The foregoing description of preferred embodiments is illustrative only, and, is not to be considered as limiting the invention thereto.

I claim as my invention:

1. In a process of carrying out a reversible exothermic chemical reaction, the improvement which comprises controlling the temperature of a positioned portion of the reaction mixture by the method comprising: isolating and transferring two small portions of the reaction mixture of said positioned portion into adiabatic reaction zones; imparting an incremental temperature change to at least one of the isolated portions so that one isolated portion is at a higher temperature than the other isolated portion; continuing the same chemical reaction in each isolated portion in said adiabatic reaction zones under substantially the same conditions as those of the said positioned portion except for said incremental temperature difference to thereby produce in each of said portions a measurable change in the value of a measurable property of the reaction mixture which changes progressively as said chemical reaction proceeds: comparing reaction rates in the isolated portions within the adiabatic reaction zones at substantially the composition of the reaction mixture of said positioned portion by measuring changes in the values of said measurable property over short time periods; and adjusting the temperature of said positioned portion of the reaction mixture in the direction of the temperature of the isolated portion which produces the greater reaction rate.

2. In a process of carrying out a reversible exothermic chemical reaction, the improvement which comprises controlling the temperature of a positioned portion of the reaction mixture by the method comprising: isolating and transferring two small portions of the reaction mixture of said positioned portion into adiabatic reaction zones; imparting an incremental temperature change to at least one of the isolated portions so that one isolated portion is at a higher temperature than the other isolated portion; continuing the same chemical reaction in each isolated portion in said adiabatic reaction zones under substantially the same conditions as those of the said positioned portion except for said incremental temperature difference to thereby produce in each of said portions a measurable temperature rise; comparing the rates of temperature rise of said isolated portions within the adiabatic reaction zones at substantially the composition of the reaction mixture of said positioned portion; and adjusting the temperature of said positioned portion of the reaction mixture in the direction of the temperature of the isolated portion which produces the higher rate of temperature rise.

3. In a process of carrying out a reversible exothermic chemical reaction and reaction product of which has an index of refraction which is measurably different in value from the index of refraction of the reacting mixture, the improvement which comprises controlling the temperature of a positioned portion of the reaction mixture by the method comprising: isolating and transferring two small portions of the reaction mixture of said positioned portion into adiabatic reaction zones; imparting an incremental temperature change to at least one of the isolated portions so that one isolated portion is at a higher temperature than the other isolated portion; continuing the same chemical reaction in each isolated portion in said adiabatic reaction zones under substantially the same conditions as those of the said positioned portion except for said incremental temperature difference to thereby produce in each of said portions a measurable change in the index of refraction; comparing the rates of change in index of refraction of said isolated portions within the adiabatic reaction zones at substantially the composition of the reaction mixture of said positioned portion; and adjusting the temperature of said positioned portion of the reaction mixture in the direction of temperature of the isolated portion which produces the higher rate of change in index of refraction.

4. In a process of carrying out a reversible exothermic chemical reaction, the improvement which comprises controlling the temperature of a positioned portion of the reaction mixture so that the temperature thereof is the temperature at which the net rate of reaction of said positioned portion is at a maximum at the concentration at which the reaction mixture occurs therein by the method comprising: isolating and removing two small portions from the reaction mixture of said positioned portion; imparting an incremental temperature change to at least one of the isolated portions so that one isolated portion is at a higher temperature than the other isolated portion; continuing the same chemical reaction in each isolated portion under substantial adiabatic conditions in separate reaction zones thereby to produce a measurable temperature rise therein; comparing the rates of temperature rise of said isolated portions in said reaction zones substantially at the said concentration of the reactants; adjusting the temperature of said positioned portion of the reaction mixture in the direction of the temperature of the isolated portion which produces the higher rate of temperature rise in the adiabatic reaction; and repeating the foregoing described operations until the difference in the rates of temperature rise of the isolated portions reaches a minimum and begins to change in sign, whereat the temperature of said positioned portion of the reaction mixture is the temperature corresponding to the maximum net rate of reaction at the concentration at which the reactants occur therein.

5. In a process of carrying out a reversible exothermic chemical reaction, the improvement which comprises controlling the temperature of a positioned portion of the reaction mixture so that the temperature thereof is the temperature at which the net rate of reaction of said positioned portion is at a maximum at the concentration at which the reaction mixture occurs therein by the method comprising: isolating and removing two small portions from the reaction mixture of said positioned portion; simultaneously heating one of said isolated portions a few degrees and cooling the other one of said isolated portions a substantially equal number of degrees; continuing the same chemical reaction in each isolated portion under substantial adiabatic conditions in separate reaction zones thereby to produce a measurable temperature rise therein; comparing the rates of temperature rise of said isolated portions in said reaction zones substantially at the said concentration of the reactants; adjusting the temperature of said positioned portion of the reaction mixture in the direction of the temperature of the isolated portion which produces the higher rate of temperature rise in the adiabatic reaction; and repeating the foregoing described operations until the difference in the rates of temperature rise of the isolated portions reaches a minimum and begins to change in sign, whereat the temperature of said positioned portion of the reaction mixture is the temperature corresponding to the maximum net rate of reaction at the concentration at which the reactants occur therein.

6. In a process of carrying out a reversible exothermic chemical reaction in a batch-type operation wherein the reaction is effected in a batch-type reaction zone, the improvement which comprises controlling the temperature of the reaction mixture in the reaction zone during at least a substantial proportion of the time of the operation by the method comprising: isolating two small portions of the reaction mixture in the reaction zone; imparting an incremental temperature change to at least one of the isolated portions so that one isolated portion is at a higher temperature than the other isolated portion; continuing the same chemical reaction adiabatically in each isolated portion to thereby produce a measurable temperature rise therein; comparing the rates of temperature rise of the two isolated portions over time periods that are short relatively to said time of operation; adjusting the temperature of said reaction mixture in the reaction zone in the direction of the temperature of the isolated portion which produces the higher rate of temperature rise in the adiabatic reaction; repeating the foregoing described control operations until the difference in the rates of temperature rise reaches a minimum and begins to change in sign, thereby adjusting the temperature of said reaction mixture to the temperature corresponding to the maximum net rate of reaction at which the concentration of the reactants occur therein; and continuing such control operations to thereby maintain the temperature at the temperature of maximum net rate of reaction at the varying concentrations at which the reactants occur in the reaction zone as the reaction progresses therein for at least a substantial time of the reaction.

7. In a process of carrying out a reversible exothermic chemical reaction in a continuous flow reaction zone, the improvement which comprises controlling the temperatures within a plurality of successive positioned zones therein at those temperatures, respectively, at which the maximum rates of reaction are possible at the concentrations at which the reactants occur in those respective positioned zones, by the method comprising: withdrawing two streams of reaction mixture from the first of said successive positioned zones on the up-stream side of the flowing reaction mixture; simultaneously passing said streams through a heating zone and a cooling zone, respectively, to raise the temperature of the material in one stream and to lower the temperature of the material in the other stream by small temperature changes; passing the thus heated and cooled streams through adiabatic reaction zones and therein continuing the same chemical reaction adiabatically in each steam; measuring the rates of temperature rise in the two streams over periods of time that are short in relation to the time required for the flow of the reaction mixture through said continuous flow reaction zone; adjusting the temperature of the reaction mixture in said first positioned zone in the direction of the temperature of the withdrawn stream which produces the higher rate of temperature rise in the adiabatic reaction zone; continuing such control operations until the difference in rates of temperature rise in said withdrawn streams reaches a minimum and begins to change in sign, thereby adjusting the temperature of said first positioned zone to the temperature corresponding to maximum net rate of reaction at the concentrations at which the reactants occur therein; and applying the foregoing described control operations to the others of said successive positioned zones in sequence.

8. In a process of carrying out a reversible exothermic chemical reaction in a continuous flow reaction zone, the improvement which comprises controlling the temperatures within a plurality of positioned zones therein at those temperatures, respectively, at which the maximum rates of reaction are possible at the concentrations at which the reactants occur in those respective positioned zones, by the method comprising: withdrawing paired streams of reaction mixture from each of said positioned zones; passing each pair of streams through a temperature-changing zone wherein one of the streams of each pair is heated and the other stream of the same pair is cooled to raise and lower, respectively, the temperatures of the materials therein by small temperature changes; passing the thus heated and cooled streams of each pair of streams through adiabatic reaction zones and therein continuing the same chemical reaction adiabatically in each stream; measuring the rates of temperature rise in each stream over periods of time that are short in relation to the time required for the flow of the reaction mixture through said continuous flow reaction zone; adjusting the temperature of the reaction mixture in each of said positioned zones in the direction of the temperature of the paired stream withdrawn from the respective positioned zone that produces the higher rate of temperature rise in the adiabatic reaction zone; and continuing such control operations until the differences in the rates of temperature rise in said paired streams reaches a minimum and begins to change in sign, thereby adjusting the temperature of the reaction mixture in each of said positioned zones to the temperature corresponding to maximum net rate of reaction at the concentration at which the reactants occur therein.

DANIEL B. LUTEN, JR.

REFERENCES CITED

The following references are of record in the file of this patent:

UNITED STATES PATENTS

| Number | Name | Date |
|---|---|---|
| 1,594,264 | Howard | July 27, 1926 |
| 2,215,498 | Fazel | Sept. 24, 1940 |
| 2,355,658 | Lawlor | Aug. 15, 1944 |
| 2,386,831 | Wright | Oct. 16, 1945 |

OTHER REFERENCES

Groggins, Unit Processes in Organic Synthesis, second ed. (1938), McGraw Hill Book Co., New York, page 539.